Oct. 13, 1931.  B. U. ROACH  1,827,488
FISHING LINE REEL
Filed July 17, 1929
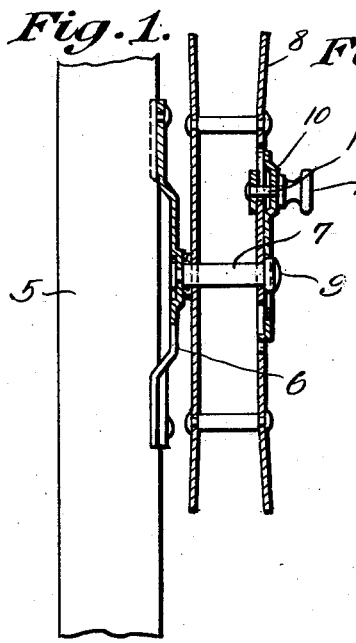
Fig.1. Fig.2.
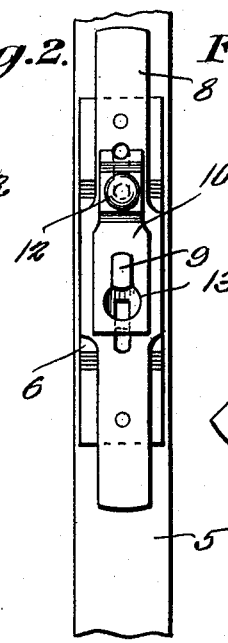
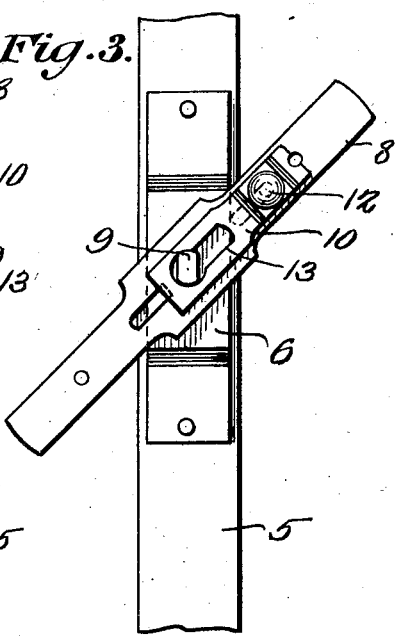
Fig.3.
Fig.4. Fig.5. Fig.6. Fig.7.
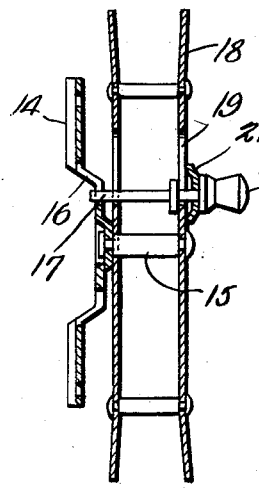
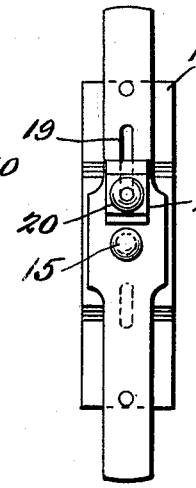
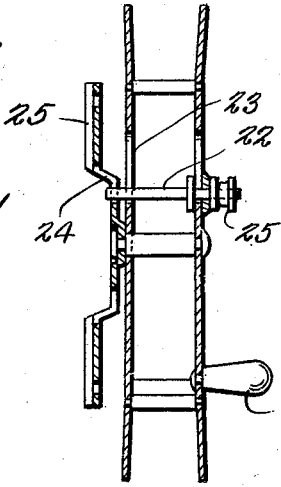
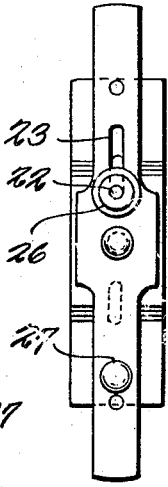
Burtus U. Roach, Inventor
By C.A.Snow&Co.
Attorneys.

Patented Oct. 13, 1931

1,827,488

UNITED STATES PATENT OFFICE

BURTUS UGIEN ROACH, OF BRONSON, MICHIGAN

FISHING LINE REEL

Application filed July 17, 1929. Serial No. 378,974.

This invention relates to fishing line reels, the primary object of the invention being to provide novel means for locking the reel against rotary movement when the desired length of line has been unreeled.

An important object of the invention is to provide a locking means of this character which may be readily and easily released to permit the reel to be rotated to reel or unreel the line.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a sectional view through a fishing line reel constructed in accordance with the invention.

Figure 2 is a plan view thereof.

Figure 3 is a plan view showing the reel as moved to its normal position.

Figure 4 is a longitudinal sectional view through a reel provided with a modified form of locking means.

Figure 5 is a plan view thereof.

Figure 6 is a longitudinal sectional view through a further modified form of the invention.

Figure 7 is a plan view thereof.

Referring to the drawings in detail, the reference character 5 designates a fishing rod, to which the reel forming the subject matter of this invention, is secured.

The reel includes a support 6 which is in the form of a bracket that may be secured to the rod 5 in any desired manner. Extending from the support or bracket 6 is a shaft 7 on which the reel 8 is mounted, the shaft 7 being provided with a head 9 formed with straight side surfaces. The reference character 10 designates a locking plate which is slidably mounted on the reel and held in position by means of the bolt 11 extending from the finger piece or handle 12, which bolt passes through an elongated opening formed in one side of the reel, to permit of sliding movement. This locking plate 10 is provided with an opening having an elongated portion 13 which is of a width to accommodate the head 9, so that when the plate is moved to a position as shown by Figure 2 of the drawings the reel will be secured against rotary movement.

When it is desired to rotate the reel, the locking plate is slid to a position as shown by Figure 3 of the drawings, whereupon the head 9 moves within the enlarged portion of the opening, allowing the reel to be rotated to wind the fishing line thereon.

In the form of the invention as shown by Figure 4, the support or bracket is indicated by the reference character 14 and is provided with a supporting shaft 15 that extends laterally therefrom. The bracket 14 is arched and is provided with a slot 16 to receive the pin 17 that extends through the reel 18. The pin 17 is movable through the elongated openings 19 of the side sections of the reel, there being provided a handle 20 at one end of the pin to permit the operator to slide the pin through these openings when it is desired to lock or unlock the reel.

In order that the locking pin will be held in its active or inactive position, a friction member 21 is secured thereto and operates to set up a binding action between the reel and member 21.

It might be further stated that the member 20 also acts as a handle to rotate the reel on winding the line thereon. As shown by Figure 6 of the drawings the reel is provided with a locking pin 22 movable through the elongated opening 23 of the reel, the inner end of the pin being constructed to move into the slot 24 of the bracket 25, the pin being provided with a nut 26 by means of which it might be slid into and out of operation. A handle 27 is provided on the reel adjacent to one end thereof, whereby the reel may be rotated.

From the foregoing it will be obvious that due to the construction shown and described, the reel may be readily locked against rotary movement and may be readily released to permit the fishing line to be reeled or unreeled therefrom.

I claim:

1. In a reel, a bracket having an offset portion, formed with a slot, a shaft extending from the bracket, a reel rotatably mounted on the shaft, said reel having elongated openings, a pin slidably mounted in the elongated openings and adapted to extend into the slot of the bracket to hold the reel against rotary movement, and means for normally holding the pin against movement.

2. In a reel, a bracket having a longitudinal opening, a reel mounted for rotary movement on the bracket, a pin slidably mounted on the reel and adapted to extend into the elongated opening to hold the reel against rotary movement, and means for normally holding the pin against movement.

In testimony that I claim the foregoing as my own, I have hereto affixed my signature.

BURTUS UGIEN ROACH.